(12) United States Patent
Rupp

(10) Patent No.: US 8,347,546 B2
(45) Date of Patent: Jan. 8, 2013

(54) TELESCOPIC OUTRIGGER POLE

(75) Inventor: Scott Rupp, Port Salerno, FL (US)

(73) Assignee: Rupp Marine, Inc., Port Salerno, FL (US)

( * ) Notice: Subject to any disclaimer, the term of this patent is extended or adjusted under 35 U.S.C. 154(b) by 203 days.

(21) Appl. No.: 12/874,727

(22) Filed: Sep. 2, 2010

(65) Prior Publication Data

US 2011/0083356 A1 Apr. 14, 2011

Related U.S. Application Data

(60) Provisional application No. 61/251,175, filed on Oct. 13, 2009.

(51) Int. Cl.
*A01K 91/00* (2006.01)
(52) U.S. Cl. .............. 43/27.4; 43/18.1 CT; 248/255; 248/364
(58) Field of Classification Search ............ 43/21.2, 43/27.4, 43.13, 18.1 R, 18.1 CT; 114/255, 114/364; *A01K 97/10, 91/00, 87/04, 87/08*
See application file for complete search history.

(56) References Cited

U.S. PATENT DOCUMENTS

| | | |
|---|---|---|
| 4,384,542 A | 5/1983 | Wilson |
| 4,504,164 A | 3/1985 | Bien |
| 4,621,431 A | 11/1986 | Fatool et al. |
| 4,889,064 A | 12/1989 | Rupp, III |
| 4,993,346 A | 2/1991 | Rupp |
| 5,387,048 A | 2/1995 | Kuo |
| 5,487,604 A | 1/1996 | Moran |
| 5,540,017 A | 7/1996 | Eilam et al. |
| 5,592,893 A | 1/1997 | Jordan, III et al. |
| 5,738,035 A | 4/1998 | Rupp, II |
| 5,778,817 A | 7/1998 | Rupp |
| 5,921,196 A * | 7/1999 | Slatter .......................... 114/255 |
| 5,951,078 A * | 9/1999 | Whitehead et al. .......... 294/54.5 |
| 6,006,477 A | 12/1999 | Ko |
| 6,494,636 B1 | 12/2002 | Mozena |
| 6,761,501 B1 | 7/2004 | Nakatani |
| 6,769,377 B2 | 8/2004 | Rupp, II |
| 6,854,919 B2 | 2/2005 | Neumann et al. |
| 7,025,015 B2 | 4/2006 | Wilcox et al. |
| 7,025,105 B2 * | 4/2006 | Lancina .......................... 160/41 |
| 7,111,574 B2 | 9/2006 | Slatter |
| 7,293,934 B1 | 11/2007 | Huang |
| 7,311,061 B1 | 12/2007 | Wiese |
| 2004/0035350 A1 * | 2/2004 | Rupp, II ........................ 114/364 |

* cited by examiner

*Primary Examiner* — Darren W Ark
*Assistant Examiner* — Thien Thanh Pham
(74) *Attorney, Agent, or Firm* — McHale & Slavin, P.A.

(57) ABSTRACT

A telescopic outrigger for use with fishing vessels. The outrigger of the instant invention has multiple tubes that are circular in shape and each include a means for securing to an adjoining tube and locking in a position relative thereto. The circular shape allowing for ease of sealing the connecting components from the elements. An internal locking mechanism for positive interlocking of adjoining tubes can be accessed externally for ease of servicing. The extension of the adjoining tubes by the locking mechanism allows for movement of the outrigger pole from a stowage position to a deployment position and vice versa.

14 Claims, 6 Drawing Sheets

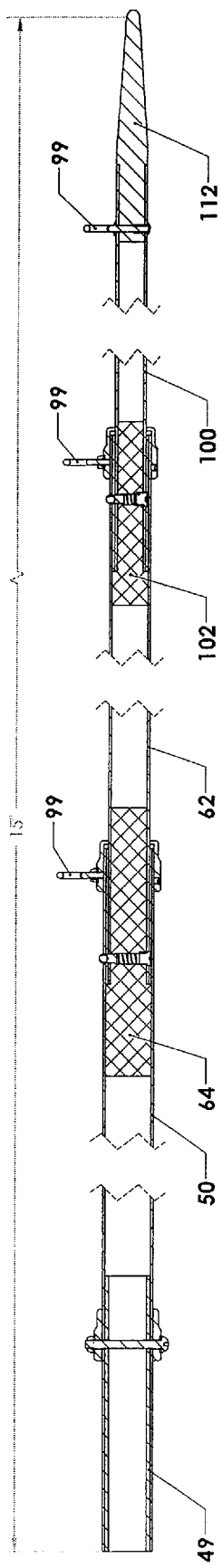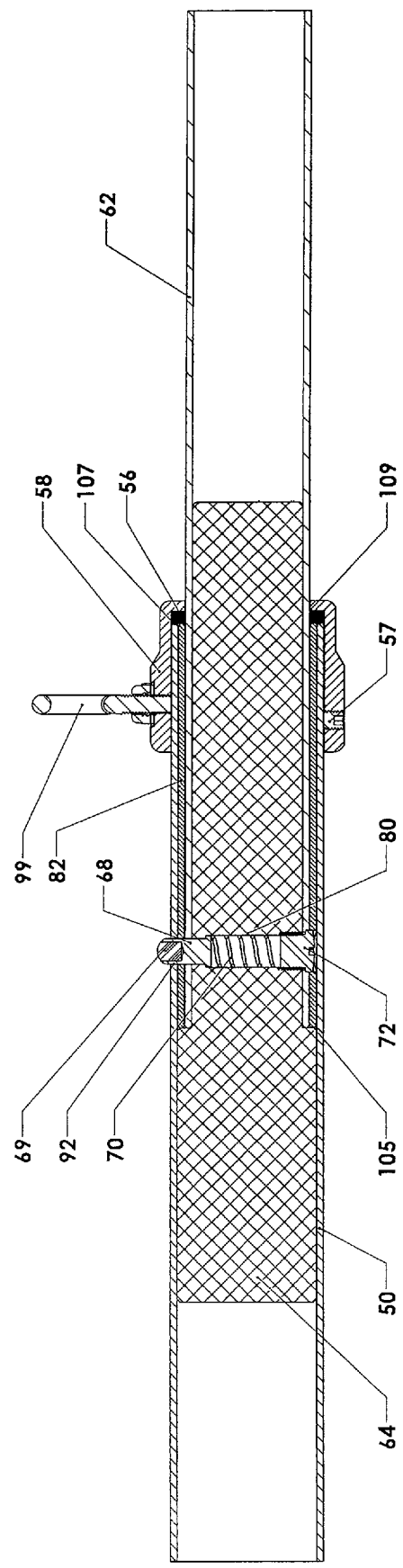

TELESCOPIC OUTRIGGER POLE

PRIORITY CLAIM

This application claims the priority date of U.S. Provisional Patent Application No. 61/251,175, filed Oct. 13, 2009, the contents of which is incorporated herein by reference.

FIELD OF THE INVENTION

The invention relates to the field of fishing and more particularly to a telescoping outrigger pole for use on fishing boats.

BACKGROUND OF THE INVENTION

Outriggers are a common fixture on fishing vessels. Open fishing vessels typically run extremely fast and are highly maneuverable making them the preferred vessel for most fishing events. Smaller fishing vessels, especially those that are operated at high speed or have height restraints, have a particular advantage in using outriggers that can be stored in a compact position and telescope for use as a full sized outrigger.

Mounting an outrigger system on an open fishing vessel is typically performed from the T-top but can easily be adapted to sidewalls and even rod holders. Many open fishing vessels now include the use of the T-top that, as the name implies, is formed from a "T" like structure to provide shade and rain protection for those standing around the console. The T-top does not inhibit operation of the vessel and allows an occupant to walk around the vessel uninhibited in a semi-protected position.

Fishing with outriggers is performed when a fishing vessel is driven slowly, commonly referred to as trolling, which permits the strategic placement of bait behind the vessel. Trolling allows the fishing vessel to cover large areas of water so as to increase the chance of catching fish. The quantity and spacing of the bait placed behind the vessel is generally proportional to the size of the vessel, as well as the success of the fishing expedition. If the bait is properly placed, the wake generated by the vessel can be made to appear like a school of fish. Bait that appears to be struggling or separated are most attractive to predator fish.

The positioning of bait behind a vessel would be limited to the width of the vessel but for the use of the outriggers. Smaller fishing vessels have a beam less than ten feet and trolling with more than two fishing lines behind such a vessel provides very little distance between the baits and further limits the ability to place bait outside of the boat wake. Further, trolling with two lines behind a narrow beam vessel severely limits vessel maneuvering. Even a gradual turn may cause bait lines to cross and become entangled. In addition, closely positioned baits can become entangled during a fish strike. The use of outriggers provides a means for effectively widening the spacing of the bait, as well as adding additional bait/lines without fear of tangling of the lines.

An outrigger is basically a long pole having a proximal end coupled to the vessel and a distal end that can be rotated from a stowage position outboard to a trolling position. A positioning line is drawn along the length of the outrigger pole wherein release clips secured to the positioning line are used to secure the fishing pole line at a desired outboard location. When a fish strikes the bait, the release clip disengages the fishing line from the positioning line, and the fisherman is free to reel in the fish without interference.

For example, a fifteen foot outrigger placed on each side of a vessel having an eight foot beam allows the placement of bait across a large area thereby increasing the opportunity of catching fish. However, having outrigger poles extend from each side of a vessel during non-fishing times has obvious drawbacks. For this reason, outriggers must be stowable to allow for normal traveling and docking. The outriggers are typically stored within the vertical plane of the vessel, the vertical plane defined by the side walls of the vessel. In operation, a fixed outrigger is swung laterally outward to a deployed position for fishing purposes. Outrigger poles may be ten to over thirty feet long with the longer poles having cable trusses to prevent excessive flexing. The length of the fixed poles makes it difficult to remove for storage away from the vessel, thus the vessel owner must accommodate for the onboard storage of fixed outriggers even when the vessel is not use for fishing.

Mounting of long outriggers to open fishing vessels presents numerous problems, mainly due to storage when they are not in use. If a vessel employs the elongated outriggers, the outriggers could easily extend over the rear of the vessel. If the vessel has backed into a dock, the outriggers could extend over the dock leading to a most dangerous position. Even if the vessel is docked with it bow inward, the use of long outriggers hanging over the transom could affect boat traffic behind the vessel. Another problem can be low bridges which must be taken into account while passing beneath the bridge.

Another problem with long outriggers can be traveling in high speeds or over large swells. Even if the outriggers are in a stored position, long outriggers can place a large strain on the mounting base wherein the cantilever effect can easily damage the base. Also, should the full length of an outrigger be deployed in large swells, should the boat be caught in a trough the long outrigger could dip beneath water which can damage the outrigger.

An alternative to fixed outriggers is the use of a telescoping outrigger. Such an outer may use multiple tubes to that can be stored within each other or extended outwardly when needed. In a compressed state, the outrigger is compact for each of storage or movement. While the outrigger may maintain a conventional tubular shape, a non tubular, shaped, or grooved tube may be used as to prevent rotation of the member tubes to ease in locking during the telescoping step. However, shaped tubes, and tubes that are grooved are more expensive to manufacture, are not appealing to the consumer, and the shape is known for galling of metals. Further, shapes and grooves do not allow for the proper sealing between members leading to early corrosion problems.

U.S. Pat. No. 5,921,196 discloses an outrigger assembly for use with a fishing vessel having an elongated tubular section in receipt of smaller cross-sections telescopingly joined, which are movable from a retracted position to a fully extended position. A spring lock assembly is formed from a hair pin styled spring wherein a locking button is attached to one spring leg and an opposing second spring engages an inside wall portion of the elongated tubular section. The assembly includes multiple extension tubes each with an internally positioned spring lock for locking each tube in an extended position. The internally positioned spring lock is commonly used with patio umbrellas and known to be easily dislodged and difficult to reposition.

U.S. Pat. No. 7,111,574 discloses an outrigger assembly for use with a fishing vessel employing multiple D-shaped extension tubes. The D-shape prevents rotation of the individual telescoping tubes when moved from a stowage position to a deployment position.

U.S. Pat. No. 7,025,015 discloses an outrigger assembly for use with a fishing vessel having multiple extension tubes each with an external groove and cooperating internal protrusion. The groove and protrusion interface to prevent rotation of the extension tube when being moved from a stowage position to a deployment position. By preventing the rotation, a spring load plunger used to interlock adjoining extension tubes is always aligned.

U.S. Pat. No. 4,621,431 discloses a telescoping device having pins that rest in grooves upon the extension of subsequent telescoping sections. The multiple shaped tubes lead to premature wear in an operation such as seawater use and the locking mechanism disclosed is a series of pins having a butting end within grooves so that the pin prevents the tube from escaping outward.

U.S. Pat. Nos. 6,006,477; 6,761,501; and 6,854,919 disclose telescoping tubes each having a spring lock to interlock the individual tubes.

U.S. Pat. No. 5,387,048 discloses an umbrella having telescoping tubes wherein a spring loaded plunger is employed for engagement of multiple tubes.

U.S. Pat. No. 5,540,017 discloses a flag pole having telescoping tubes wherein a rotation of the tubes is inhibited by use of an inwardly protecting rib.

The Assignee of this present invention is the owner of U.S. Pat. Nos. 5,738,035; 4,993,346; 6,769,377, and Provisional Ser. No. 61/251,009 incorporated herein by reference, which teach the use of outriggers for use on fishing vessels having a T-top, half tower, or the like.

Accordingly, what is lacking in the art is a telescoping outrigger that eliminates the need for groove or odd shaped members to assist in deployment locking.

SUMMARY OF THE INVENTION

The instant invention discloses an improved telescopic outrigger for use with fishing vessels. The outrigger has multiple tubes that are circular in shape and each include a collar mounted on a first outrigger tube that is operatively associated with a shoulder and plunger base sleeve mounted on a second outrigger tube. The second outrigger tube slidable within the first outrigger tube. A movable shoulder bolt is securable to the collar thereby locking said first and second outrigger in a fixed position.

An objective of the invention is to provide a telescoping outrigger that retains the smooth cylindrical outer shape to allow for ease of assembly, cleaning and polishing.

Another objective of the invention is to disclose a telescoping outrigger that eliminates the need for shaped tubes and/or grooved tubes for use in extension tube alignment.

Still another objective of the instant invention is to teach the use of conventional tubing to lower production costs yet improving longevity and appearance.

Still another objective of the instant invention is to disclose the use of a locking mechanism that is engaged external of the telescoping poles and can be accessed for repair or replacement without the use of special tools.

Yet another objective of the instant invention is to provide telescoping outrigger that allows for rotation of the tubes between the stowage position and the deployment position and the use of seals to inhibit matter from being trapped within the support sections.

Other objectives and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objectives and features thereof.

BRIEF DESCRIPTION OF THE DRAWINGS

FIG. 5 is a cross sectional view of the plunger assembly shown in an engaged position;

FIG. 8 is a cross sectional side view of a 15' telescoping pole assembly in an extended position.

DETAILED DESCRIPTION OF THE PREFERRED EMBODIMENT

Figure 1:
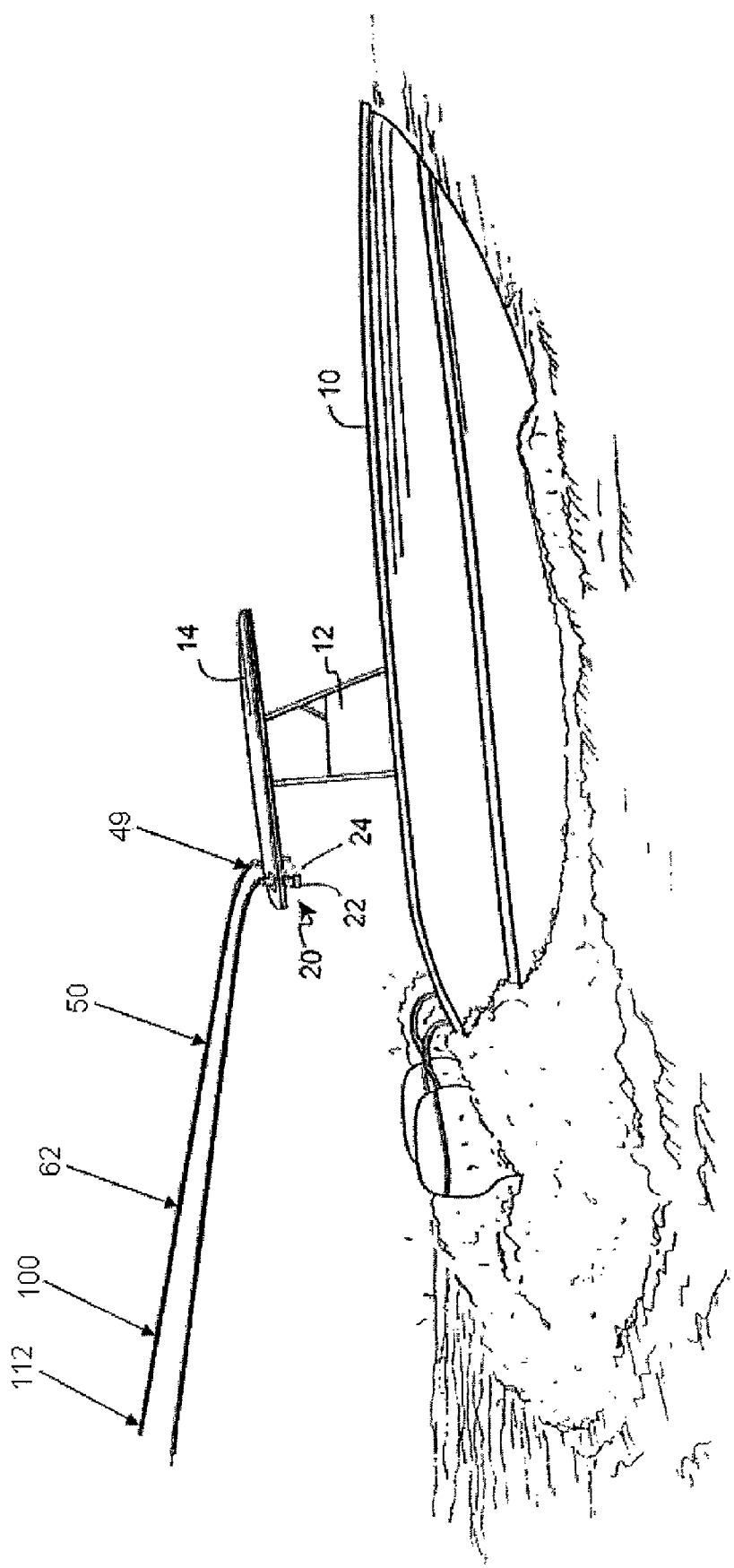
FIG. 1 is a pictorial view of a vessel with the telescoping pole of the instant invention.

Now referring to the figures, set forth is a fishing vessel 10 having a centrally located console 12 with a T-top 14 extending over the console 12 providing an area of shade for the those occupants standing around the console. The outrigger assembly 20 of the instant invention includes a base member 22 securable to the T-top 14 having a drive handle positioner 24 mounted beneath the structure 14. Operation of the drive handle positioner 24 allows the outrigger to have rotational positioning in a horizontal plane relationship to the base member. In this manner the positioner 24 provides positive movement of the distal end 112 of the outrigger pole between a stowage position and a trolling position. For ease of illustration, this specification will be directed to the use of a manual rotatable crank which is not limiting but rather for purposes of illustration.

The telescoping outrigger assembly of the instant invention consists of a radial base tube 49 for coupling to an outrigger positioner such as that disclosed in U.S. Pat. No. 6,769,377, the contents of which is incorporated herein by reference. The radial base tube 49 may be part of the outrigger drive assembly mounted to a vessel or may be part of the instant telescoping pole assembly depending upon the coupling necessary. A base collar 52 is secured to the radial base tube 49 providing a coupling between the radial base and a first extension tube or member tube 50 having a predetermined length. Additionally, the base collar 52 provides an internal stop so that a proximal end of member tube 64 cannot slip past the base collar 58 while in a stowage position. It should be noted that the length of the radial base tube 49 may be most any size and is dependant upon the manufacturer's preference for making the overall telescopic length and the mounting mechanism of the outrigger to a vessel. It should also be noted that longer telescoping poles may require a thicker and larger radial base for proper support.

Figure 2:
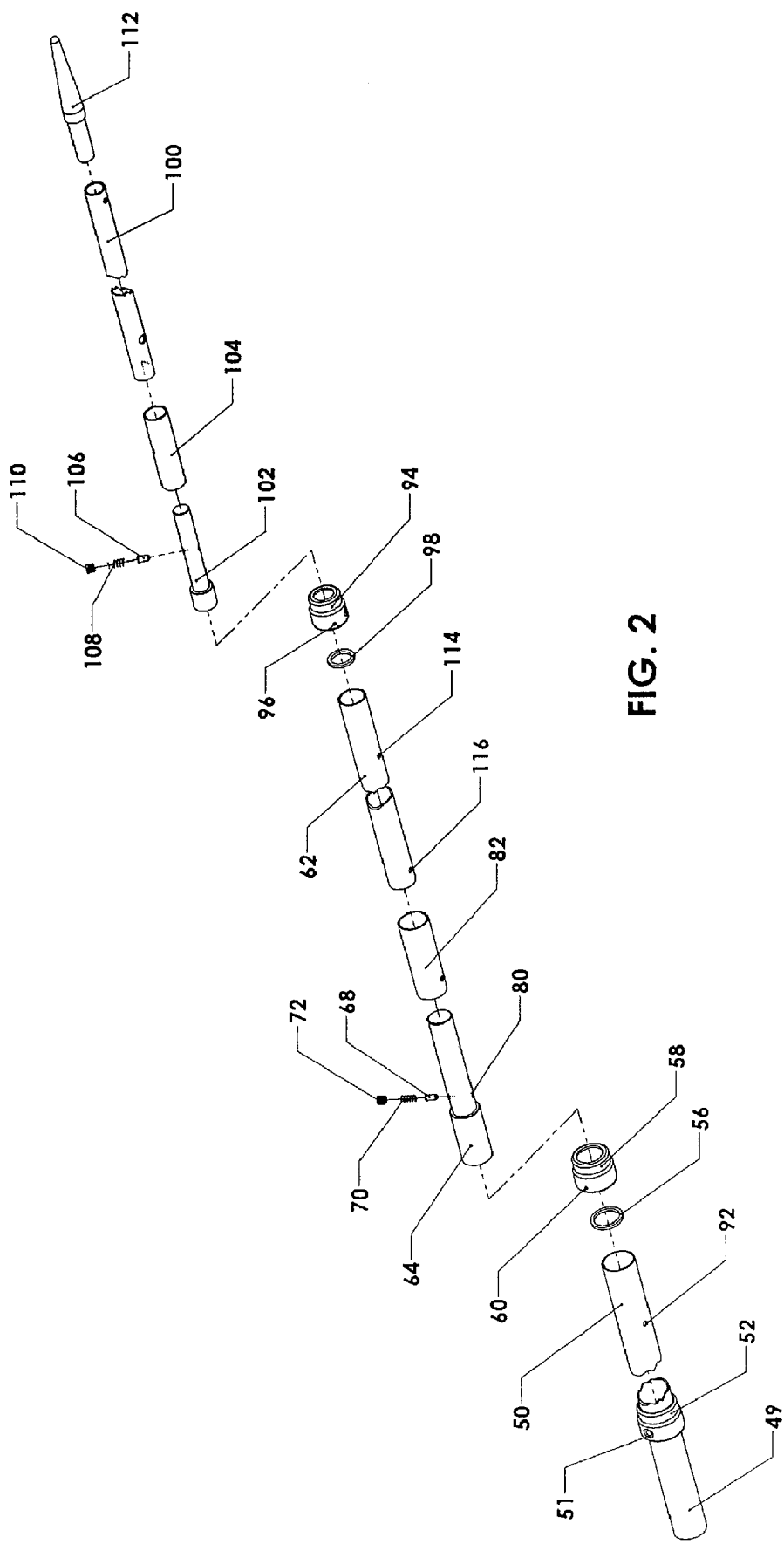
FIG. 2 is an exploded view of the telescoping pole.
Figure 3:
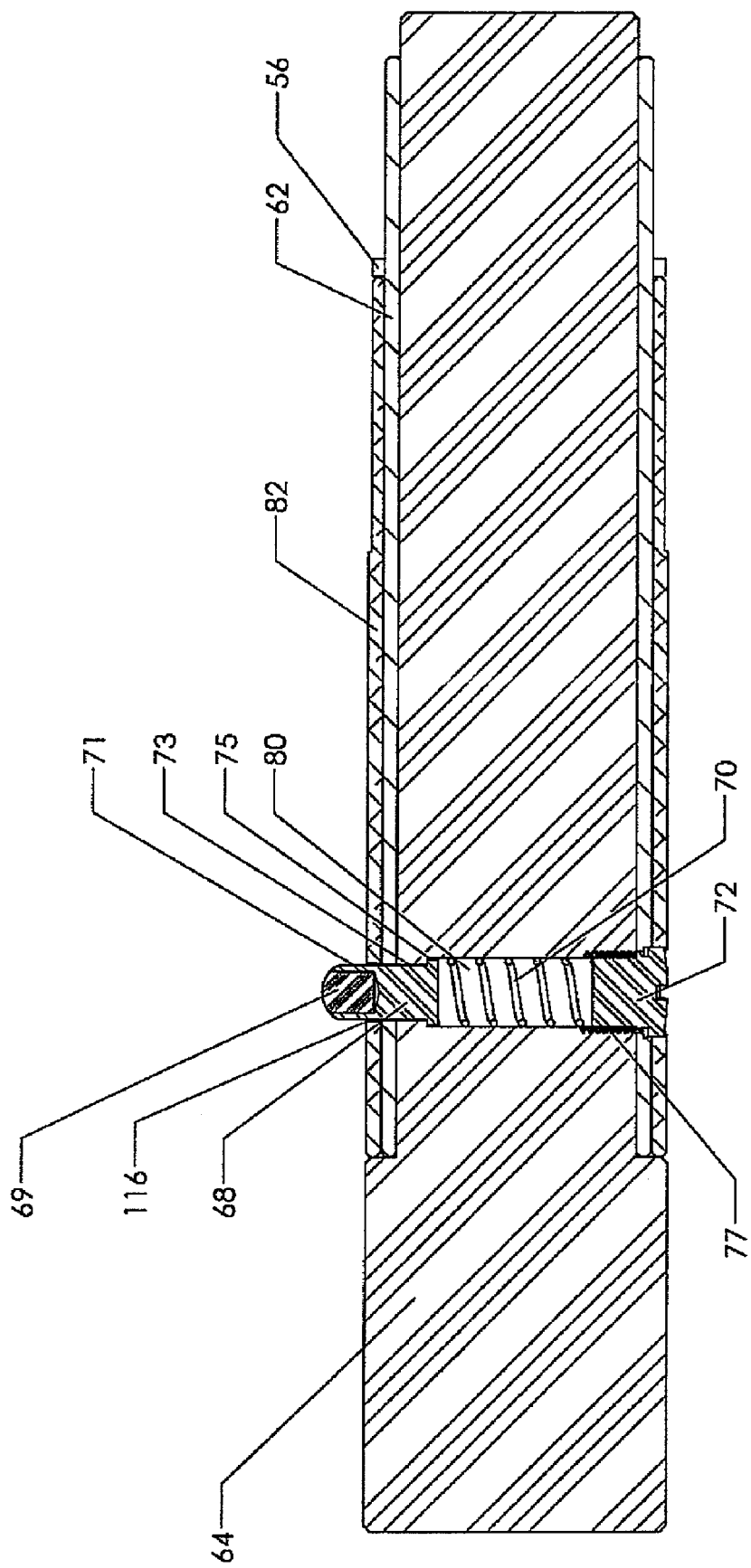
FIG. 3 is cross sectional side view of the shoulder bolt and plunger assembly.
Figure 4:
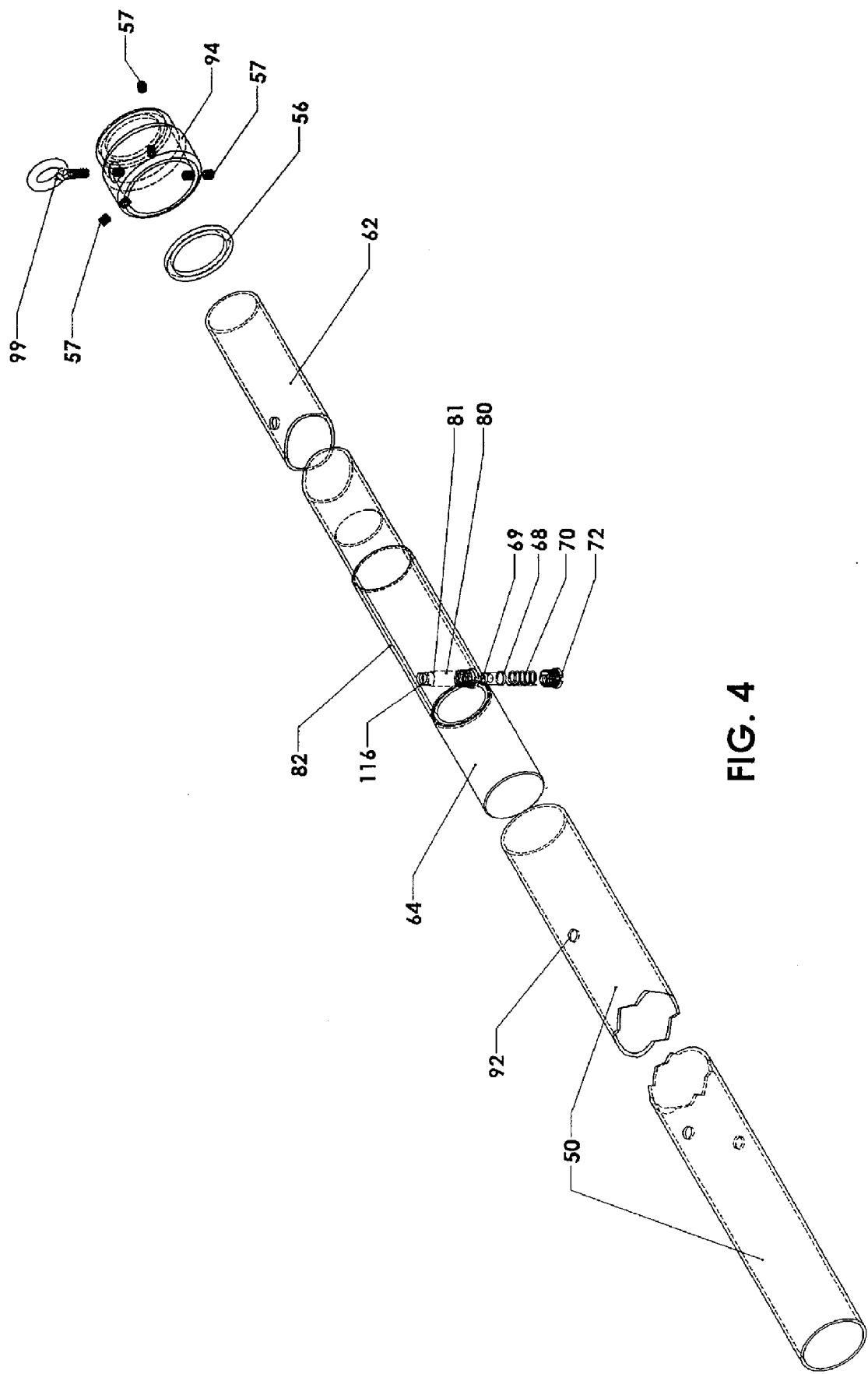
FIG. 4 is an exploded view of the shoulder bolt and plunger assembly.

Referring now to FIGS. 2-4 set forth is a member tube 50 as coupled to the base collar 52 by use of fasteners 51. In this embodiment, first member tube 50 has a predetermined length ending with a bushing 56 and large collar 58 secured to the distal end of member tube 50 by the use of fasteners 57. Before securement of the large collar 58 onto the member tube 50, the second member tube 62 is made ready for securement to the first member by placement of a plunger base 64 into the open end of member tube 62 which is constructed and arranged for slidable insertion with the member tube 50 but not through the large collar 58. It is noted that the plunger base 64 is secured after the member tube 62 is placed through the collar 58, and once fastened to the tube the plunger base 64 does not extend beyond the large collar 58.

The plunger base 64 forms part of a locking mechanism consisting of a plunger 68 biased by a spring 70 and a threaded shoulder bolt 72. The first end 71 of the plunger 68 includes a plastic tip 69 that prevents the scratching of the inner surface of a member tube thereby maintaining the corrosion resistance of the tube. The threaded shoulder bolt 72 is threaded 77 into the plunger base 64 along aperture 80. The aperture is constructed and arranged to entrap the spring 70 between the shoulder bolt 72 and the second end 73 of the plunger 68, the aperture 80 sized to allow the first end 71 of the plunger 68 to extend into but not pass through. The plunger 68 having a lip 75 for engaging the collar 81 wherein the plunger may extend through the aperture but not pass through, The first end of the plunger allowed to extend through aperture 116. The plunger base 64 effectively operates as a stop to prevent the second member 62 from pulling out of a coupling engagement with the first member tube 50. The second member 62 is of a predetermined length preferably matching the length of first member tube 50 and is coupled to the plunger base 64 in combination with an isolating plunger base sleeve 82. The plunger base sleeve 82 is sized to correspond with the outer diameter of the plunger base 64 and is sized to slidably move within the inner chamber of the first member tube 50 so as to allow slideable insertion with minimal effort. The plunger base may be formed from delrin or other non-metallic material. Tube member 62 is moved from a storage position by inserting the end of tube member 62 into tube member 50 wherein the extension of plunger 68 through the aperture 80 of the plunger base 62 may engage the locking aperture 92 of the first member tube 50 to position adjoining member 62 in a deployed position.

The second member 62 may rotate in relation to the first member 50 when the plunger is not engaged. The plunger base 64 is sized to place the plunger 68 in a position to engage the aperture 92 of first member 50 wherein a rotation of the second member 62 in relation to the first member 50 will allow for the spring biased insertion of the plunger 68 into the aperture 92.

Similarly to the assembly of components on the first member 50, the use of a second collar 94, be it smaller than the first collar 58, and is coupled to the member tube 62 by use of fasteners 96 such as Allen screws 57. The bushing 98 provides ease of slidable movement of the tube and prevents galling from its connection with the second member tube 62. The use of a smaller plunger base 102 is inserted before mounting of the collar 94 in bushing 98. The final member of this embodiment includes the plunger base sleeve 104 which is mounted to the smaller plunger base 102 and secured by placement of the plunger 106, spring 108, and shoulder bolt 110. A tip point 112 extends from the end of the tube for aesthetic purposes, as well as to prevent matter from entering the hollow tube. It should be noted that additional tubes could be mounted to the telescoping pole, albeit the 3 sections being a preferred embodiment. Eye hooks 99 are placed along the length of the telescoping pole for use in the directional control of conventional spreader lines.

Referring now to FIG. 5, set forth is an illustration of the assembly in an extended position. Tube member 50 is shown engaged with tube member 62 by use of the plunger 68 that is biased in position by spring 70. As previously described, the plunger is assembled by placement through aperture 80 of end bolt 64. The spacer sleeve 82 is shown with a lower engagement point 105 that abuts against the plunger base 64 and an upper engagement point 107 that abuts the large bushing 56. The bushing 56 is held in position by collar 58 and with an edge 109 that is spaced apart from the outer surface of the tube 62 to prevent metal to metal contact yet provide sufficient support to the bushing 56. The plunger is shown inserted through aperture 92 for a deployed position.

Figure 6:
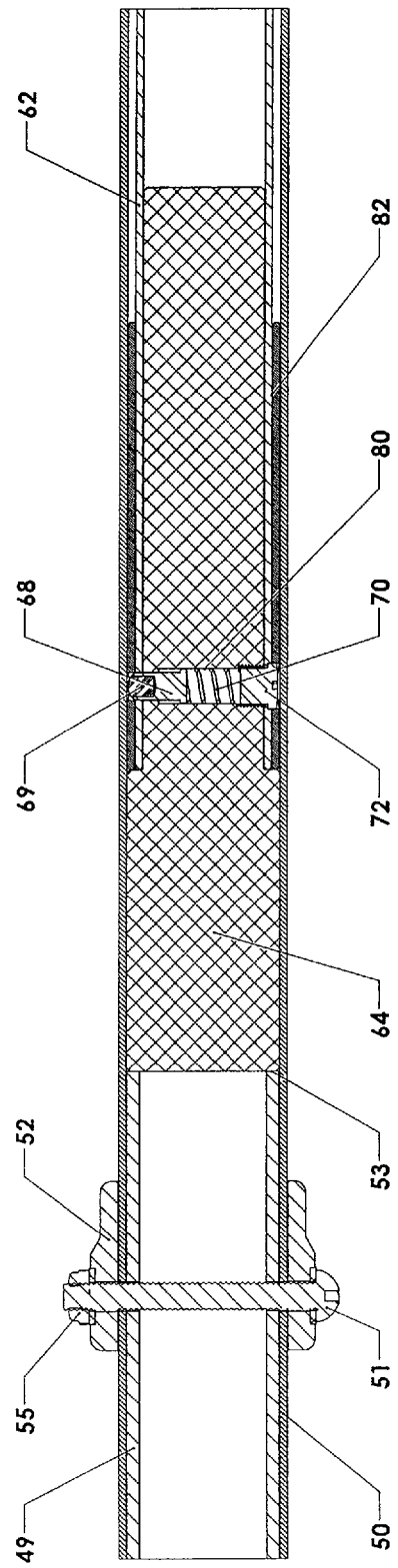
FIG. 6 is a cross sectional view of the plunger assembly shown in a disengaged position.

Referring now to FIG. 6, set forth is an illustration of the assembly in a collapsed position. Tube member 50 is shown disengaged with tube member 62 placement of the plunger 68 in a compressed position by depressing spring 70 and placing the plunger body 68 along the inner surface of tube member 50. As previously described, the plunger is assembled by placement through aperture 80 of plunger base 64. The spacer sleeve 82 is shown with a lower engagement point 105 that abuts against the plunger base 64 and an upper engagement point 107 that is now abutted against the large bushing 56. The plunger tip 69 is preferably formed from a material that will not gall the inner surface of the member tube 50. The radial base tube 49 is shown in its position within the lower end of member tube 50 providing structure reinforcement thereby allowing the use of a thinner base tube 50. The radial base tube 49 is sized a length to operate as a stop for the plunger base 64 which abuts the end 53 of the radial tube while in a collapsed position. The radial tube is secured to member tube 50 by use of a collar having fastening bolt 51 extending to fastening nut 55.

Figure 7:
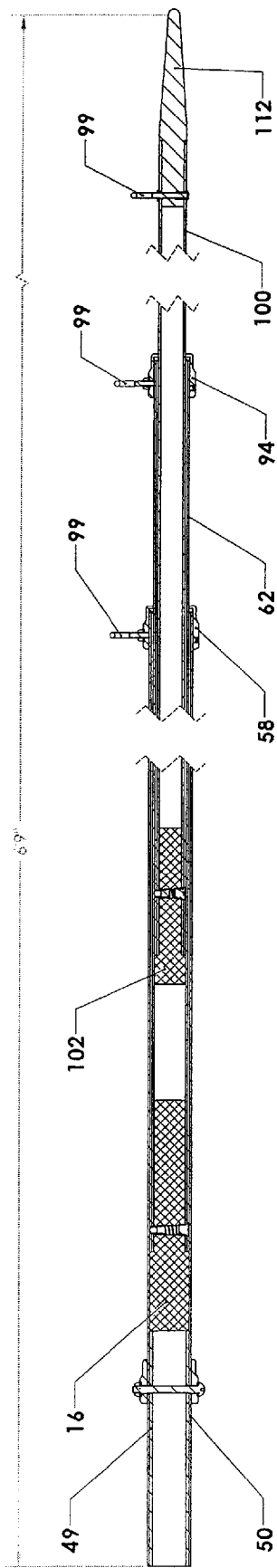
FIG. 7 is a cross sectional side view of a 15' telescoping pole assembly in a collapsed position.

FIG. 7 is a cross section view of a 15' telescoping pole embodiment in a collapsed position measuring about 6'9". The plunger base 64 and 102 are juxtapositioned with tube member 50 encompassing a majority of tube member 62 which further encompasses a majority of tube member 100. FIG. 8 is a cross section view of a 15' telescoping pole embodiment in an extended position measuring about 15'. The plunger bases 64 and 102 are each engaged with their respective tube member affixing the pole in a deployed position for use. Eye hooks 99 secured to the collars providing line guides. Eye hook 99 is used in combination with the tip 112 for securing to the tube member 100.

In operation the plunger 106 is secured to the third member tube 100 and locked in position when placed through the second member tube aperture 114. Similarly plunger 68 is placed through aperture 92 of first member tube 50 while in a deployed position.

One skilled in the art will readily appreciate that the present invention is well adapted to carry out the objectives an obtain the ends and advantages mentioned, as well as those inherent therein. The embodiments described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fishing vessel outrigger comprising:
   a least one first member tube having a proximal end and a distal end forming a length therebetween, said proximal end securable to a vessel, said distal end including at least one positioning aperture;

a least one second member tube having a proximal end and a distal end, said proximal end slidably insertable into said first member tube;

a locking mechanism securable to said proximal end of said second member tube, said locking mechanism formed from a one piece plunger base member having a first section sized for insertion into said proximal end of said second member and a second section sized to abut the proximal end of said second member; a plunger sleeve having an inner diameter sized for placement over a portion of said second member tube, said plunger sleeve having an outer diameter less than an outer diameter of said plunger base member second section; an alignment aperture extending through said plunger sleeve, said second member tube, and said plunger base member, said alignment aperture formed from a first diameter aperture positioned in a side wall of said plunger sleeve and said second member tube, a second diameter aperture positioned in said plunger base member; and a third diameter aperture formed in a portion of said plunger base member and in said second member tube side wall that is positioned diametrically across from the first diameter aperture; a plunger having a conical shaped first end with a lip disposed along a second end, said first end of said plunger is slidable disposed in said third diameter aperture; a spring member positioned within said second diameter aperture biasing said first end of said plunger outwardly; a shoulder bolt having a threaded section and a head section wherein said threaded section passes through said first diameter aperture for securement to said second aperture, said shoulder bolt engaging said first diameter aperture; and a collar securable to said distal end of said first member tube, said collar constructed and arranged to allow passage of said second member tube and prevent passage of said plunger base sleeve;

wherein said member tubes are movable between a retracted position and a fully extended locked position by placement of said plunger into a positioning aperture.

2. The fishing vessel outrigger according to claim 1 including an eyelet secured to said collar for receiving a line therethrough.

3. The fishing vessel outrigger according to claim 1 wherein said plunger base member is constructed of a non-metallic material.

4. The fishing vessel outrigger according to claim 1 wherein said member tubes are of successfully smaller cross-section telescopingly joined to form an elongated outrigger pole.

5. The fishing vessel outrigger according to claim 1 wherein each said member tube has a smooth outer wall.

6. The fishing vessel outrigger according to claim 1 wherein each said member tube has a smooth inner wall.

7. The fishing vessel outrigger according to claim 3 wherein said plunger base member is constructed from delrin.

8. The fishing vessel outrigger according to claim 1 wherein said plunger includes a plastic tip.

9. A fishing vessel outrigger comprising:

a first member tube having a proximal end and a distal end forming a length there between, said proximal end securable to a vessel, said distal end including at least one positioning aperture;

a second member tube having a proximal end slidably insertable into said first member tube;

a first locking mechanism securable to said proximal end of said second member tube, said locking mechanism formed from a one piece plunger base member having a first section sized for insertion into said proximal end of said second member and a second section sized to abut the proximal end of said second member; a plunger sleeve having an inner diameter sized for placement over a portion of said second member tube, said plunger sleeve having an outer diameter less than an outer diameter of said plunger base member's second section; an alignment aperture extending through said plunger sleeve, said second member tube, and said plunger base member, said alignment aperture formed from a first diameter aperture position in a side wall of said plunger sleeve and said second member tube, a second diameter aperture positioned in said plunger base member; and a third diameter aperture formed in a portion of said plunger base member and in said second member tube side wall that is diametrically across from the first diameter aperture; a plunger having a conical shaped first end with a lip disposed along a second end, said first end of said plunger is slidable disposed in said third diameter aperture; a spring member positioned within said second diameter aperture biasing said first end of said plunger outwardly; a shoulder bolt having a threaded section and a head section wherein said threaded section passes through said first diameter aperture for securement to said second aperture, said shoulder bolt engaging said first diameter aperture;

a first collar having a bushing securable to said distal end of said base of said first member tube, said collar constructed and arranged to allow passage of said second member tube and prevent passage of said locking mechanism;

a third member tube having a proximal end slidably insertable into said second member tube;

a second locking mechanism securable to said proximal end of said third member tube, said second locking mechanism formed from a one piece plunger base member having a first section sized for insertion into said proximal end of said second member and a second section sized to abut the proximal end of said second member; a plunger sleeve having an inner diameter sized for placement over a portion of said third member tube, said plunger sleeve having an outer diameter less than an outer diameter of said plunger base member second section; an alignment aperture extending through said plunger sleeve, said third member tube, and said plunger base member, said alignment aperture formed from a first diameter aperture position in a side wall of said plunger sleeve and said third member tube, a second diameter aperture positioned in said plunger base member; and a third diameter aperture formed in a portion of said plunger base member and in said third member tube side wall that is diametrically across from the first diameter aperture; a plunger having a conical shaped first end with a lip disposed along a second end, said first end of said plunger is slidable disposed in said third diameter aperture; a spring member positioned within said second diameter aperture biasing said first end of said plunger outwardly; a shoulder bolt having a threaded section and a head section wherein said threaded section passes through said first diameter aperture for securement to said second aperture, said shoulder bolt engaging said first diameter aperture;

a second collar having a bushing securable to said distal end of said second member tube, said collar constructed and arranged to allow passage of said third member tube and prevent passage of said locking mechanism;

an eyelet secured to each said collar for receiving a line therethrough;

wherein said member tubes are movable between a retracted position and a fully extended locked position by placement of said plunger into a positioning aperture.

10. The fishing vessel outrigger according to claim 9 wherein each said member tube has a smooth outer wall.

11. The fishing vessel outrigger according to claim 9 wherein each said member tube has a smooth inner wall.

12. The fishing vessel outrigger according to claim 9 wherein each said plunger base member is constructed from delrin.

13. The fishing vessel outrigger according to claim 9 wherein member tubes are of successfully smaller cross-section telescopingly joined to form an elongated outrigger pole.

14. The fishing vessel outrigger according to claim 1 wherein said plunger includes a plastic tip.

* * * * *